United States Patent [19]

Bosten et al.

[11] Patent Number: 5,285,708

[45] Date of Patent: Feb. 15, 1994

[54] MITER SAW ALIGNMENT SYSTEM

[75] Inventors: Donald R. Bosten; John R. Kriaski; John W. Schnell; James P. Nichols, Jr., all of Jackson, Tenn.; Steven H. Plume, St. Charles, Mo.; Matthew G. Popik, Jackson, Tenn.; Dennis C. Huntsman, Jackson, Tenn.; Randy G. Cooper, Milan, Tenn.; David V. Keller, Jackson, Tenn.

[73] Assignee: Porter-Cable Corporation, Jackson, Tenn.

[21] Appl. No.: 855,313

[22] Filed: May 18, 1992

[51] Int. Cl.⁵ .......................... B26D 7/00; B27B 5/20
[52] U.S. Cl. ................................ 83/520; 83/471.3; 83/490; 362/89
[58] Field of Search ............ 83/520, 521, 471.3, 83/478, 490, 397; 362/89, 259, 287

[56] References Cited

U.S. PATENT DOCUMENTS

| | | | |
|---|---|---|---|
| 1,476,238 | 12/1923 | Bump. | |
| 1,804,764 | 5/1931 | Grant | 83/520 X |
| 2,307,820 | 1/1943 | Butters. | |
| 2,357,194 | 8/1944 | Hazelton et al. | |
| 2,488,947 | 11/1949 | Vavrik. | |
| 2,806,492 | 9/1957 | Becker. | |
| 4,257,297 | 3/1981 | Nidbella | 83/471.3 |
| 4,413,662 | 11/1983 | Gregoire et al. | 144/356 |
| 4,503,740 | 3/1985 | Brand et al. | 83/521 |
| 4,676,130 | 6/1987 | Nutt | 83/155 |
| 4,725,933 | 2/1988 | Houk | 362/287 |
| 4,805,500 | 2/1989 | Saito et al. | 83/277 |
| 4,817,839 | 4/1989 | Weissman | 225/2 |
| 4,833,782 | 5/1989 | Smith | 30/392 |
| 4,885,965 | 12/1989 | Weissman | 83/100 |
| 4,885,967 | 12/1989 | Bell et al. | 83/520 |
| 4,887,193 | 12/1989 | Dieckmann | 83/520 X |
| 4,934,233 | 6/1990 | Brundage et al. | 83/397 |
| 4,945,797 | 8/1990 | Hahn | 83/75.5 |

Primary Examiner—Eugenia Jones
Attorney, Agent, or Firm—Merchant, Gould, Smith, Edell, Welter & Schmidt

[57] ABSTRACT

A miter saw with an optical system for projecting an optical alignment marker onto a workpiece. The miter saw has a base, a turntable rotatably supported by the base, a fence disposed above the base for supporting the orientation of the workpiece located on the base, a support coupled to the rear portion of the turntable, and a cutting apparatus including a blade for cutting the workpiece. The cutting apparatus is pivotally coupled to the support for positioning the blade from a raised position above the workpiece to an operational position for engagement with the workpiece. The light projection system is attached to the cutting apparatus for projecting an optical alignment marker onto the workpiece so that the location at which the blade engages the workpiece is in a selectably adjustable relationship with respect to the position of the optical alignment marker on the workpiece. A belt-driven embodiment of the miter saw has an adjustable pulley system comprising a motor connected to a drive pulley, a blade pulley connected to the blade, the blade pulley being in substantial alignment with the drive pulley, and a belt for connecting the drive pulley with the blade pulley. An adjustment mechanism for adjusting the distance between the drive pulley and the blade pulley is provided so that the tension on the drive belt may be adjusted.

19 Claims, 4 Drawing Sheets

MITER SAW ALIGNMENT SYSTEM

FIELD OF THE INVENTION

The present application relates to an alignment invention and a pulley system invention. The present alignment invention relates to a miter saw with an optical alignment system, an more particularly, to a miter saw with an optical system for projecting an optical alignment marker onto a workpiece. The pulley system invention relates to a belt-driven miter saw with an adjustable pulley system.

BACKGROUND OF THE INVENTION

In order to align the blade of a prior art miter saw with a cutting line on a workpiece, the operator must typically lower the saw to determine if the blade is aligned with the cutting line. If necessary, the saw is raised and the workpiece is maneuvered to improve the alignment, and the saw-lowering procedure is repeated. When precision cutting is required, this procedure is extremely time-consuming, and the desired precision is often not achieved, resulting in wasted time and material.

Further, miter saw blades have a discreet width. The cutting line, which is generally a pencil mark on the workpiece, also has a discreet width, further complicating alignment. For example, if the blade is centered directly over the cutting line, the cut in the workpiece will be inaccurate by an amount approximately equal to half the width of the blade. Consequently, it is often difficult to determine precisely where the blade will engage the cutting line.

Belt-driven miter saws with fixed center pulley systems are known in the art. While belt-driven miter saws have the advantage of producing less noise and vibration than gear-driven systems, the fixed center pulley systems used on prior art miter saws do not have the capacity to compensate for stretching and wear of the drive belt. Once the drive belt becomes stretched, it must be replaced. Further, the drive belts used on fixed center pulley systems must be manufactured to a close tolerance because there is no capacity in the fixed center pulley systems to adjust for manufacturing variation in the belt. Close tolerance belts tend to be more expensive to manufacture.

Another problem with fixed center pulley drive systems for miter saws is that the blade pulley tends to interfere with the depth of cut possible with the miter saw. Ideally, a miter saw with a 10" diameter blade should be capable of cutting a nominal 2"×6" (typically having an actual cross-sectional size of 1-½"×5-½") workpiece when the blade is oriented at 90 degrees relative to the fence and a nominal 4"×4" (typically having an actual cross-sectional size of 3-½×3-½") workpiece when the blade is oriented at 45 degrees relative to the fence. However, known blade pulleys tend to be larger than the blade flange used to anchor the blade to the miter saw, thereby reducing the depth of cut possible with the blade. Previous attempts to use small diameter pulleys which that do not interfere with the cutting radius of the blade have resulted in extensive heat buildup on the pulley system, causing accelerated wear of the drive belt and damage to the pulleys.

SUMMARY OF THE INVENTION

The present alignment invention relates to a miter saw with an optical system for projecting an optical alignment marker onto a workpiece. The optical system comprises a light projection system which is attached to a cutting apparatus for projecting a planar beam of light past one side of the blade and onto the workpiece in order to form an optical alignment marker on the workpiece. The optical alignment marker has a thickness and two sides. The optical system comprises an adjustment mechanism for adjusting the alignment marker so that the side of the alignment marker facing the blade is coincident with a plane defined by one side of the blade. The side of the linear alignment marker that is coincident with the plane defined by the one side of the blade will then designate the location at which the one side of the blade will enter the workpiece.

The preferred optical system may be used in connection with a conventional miter saw, generally having a base, a turntable rotatably supported by the base, a fence disposed above the base for supporting the orientation of the workpiece, a support coupled to the rear portion of the turntable, and a cutting apparatus including a blade for cutting the workpiece. The cutting apparatus is pivotally coupled to the support for positioning the blade from a raised position above the workpiece to an operational position for engagement with the workpiece.

DETAILED DESCRIPTION OF THE PREFERRED EMBODIMENT

Figure 1:
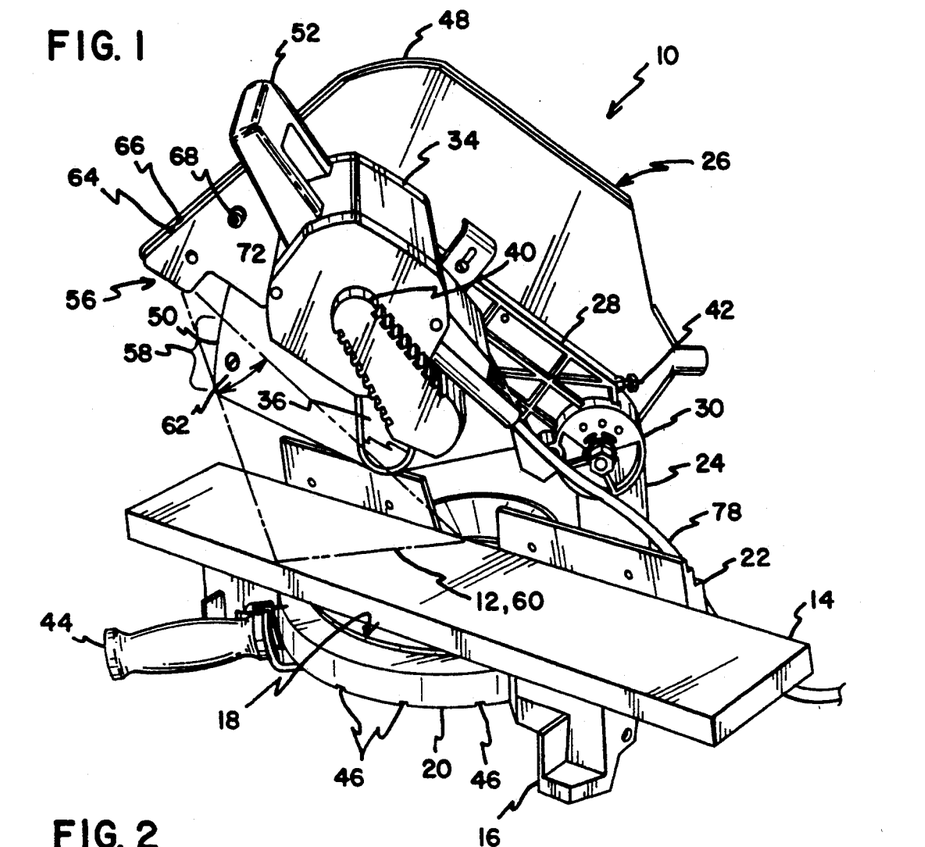
FIG. 1 illustrates a perspective view of a preferred miter saw with an optical alignment marker.

FIG. 1 illustrates a miter saw 10 with a preferred optical alignment marker 12 projected onto a workpiece 14. While FIG. 1 illustrates the preferred linear optical alignment marker 12, it will be understood from the discussion below that the optical alignment marker may be of a wide variety of configurations. The miter saw 10 preferably comprises a base 16 having a work surface 18 for supporting the workpiece 14. A turntable 20 is rotatably supported by the base 16. A fence 22 is disposed above the base 16 for supporting the orientation of the workpiece 14 located on the base 16. A support 24 is coupled by conventional means to the rear portion of the turntable 20.

The miter saw 10 shown in FIG. 1 further comprises a cutting apparatus 26 for cutting the workpiece 14. The cutting apparatus 26 generally comprises a support arm 28 coupled to the support 24 by a support coupling 30 for positioning the cutting apparatus 26 between a raised, rest position and a lowered, operational position. A support spring 32 (See FIG. 4) is enclosed within the support coupling 30 for biasing the cutting apparatus 26 to the raised, rest position. A motor 34 is connected to a blade 36 by an adjustable pulley system 38 (See FIG. 5), which is concealed behind a belt housing 40. A cutter travel screw 42 is used to establish the maximum travel of the blade 36. A power cord 78 is provided for powering the motor 34.

In its preferred configuration, the miter saw 10 will cut any angle from a 90° cut to 47° right or left. To adjust the angle of cut, a turntable handle 44 is loosened, enabling the turntable 20 to be set at a particular angle relative to the fence 22. The miter saw 10 is preferably equipped with positive stops 46 at various intervals in order to more securely retain the turntable 20 at particular angles.

The blade 36 is protected by a fixed upper blade 48 guard and a movable lower blade guard 50. When a cut is made to a workpiece 14, the lower blade guard 50 automatically moves upward in order to expose the blade 36 to the workpiece 14. The lower blade guard 50 rotates about a pivot located on the inside surface of the upper blade guard 48 (not shown). To operate the saw 14, the operator grasps a handle 52 and presses a trigger 54 (see FIG. 4) to activate the miter saw 14. The operator then presses the cutting apparatus 26 downward into the workpiece 14 so that the lower blade guard 50 is retracted and the blade 36 engages the workpiece 14.

Those skilled in the art will recognize that many configurations of motorized miter saws are possible, including changes to the base, turntable, motor arrangements, guard arrangements, linkage arrangements, dimensions, and the like. The general configuration of the miter saw 10 illustrated in FIG. 1 is set forth by way of example only.

FIG. 1 also illustrates portions of the preferred light projection system 56 of the present alignment invention. The light projection system 56 is preferably mounted in the front portion of the upper guard 48 so as to minimize the amount of sawdust and other debris coming in contact with the system 56. In the preferred embodiment, the lower blade 50 guard has a slit 58 in the front portion to allow the optical alignment marker 12 to pass unobstructed to the workpiece 14. However, it will be understood by those skilled in the art that a number of configurations are possible for orienting the light projection system 56 of the present alignment invention. In particular, the light projection system 56 may be attached to any suitable surface on the miter saw 14.

The preferred optical alignment marker 12 of the present alignment invention is of a generally linear configuration substantially parallel to the blade. The optical alignment marker 12 is preferably a beam of coherent visible light 0.030" wide. This configuration allows the operator to align the optical alignment marker 12 with a cutting line 60 on the workpiece 14. However, it will be understood that a variety of optical alignment marker configurations are possible. For example, the alignment marker 12 may be a series of dots, a crosshair, a pair of opposing arrows identifying one or both edge of the blade, etc.

The linear alignment marker has a the fan angle 62 which is preferably determined so that the linear alignment marker 12 has a length which generally corresponds to the distance from the front to the rear of the turntable 20, when the cutting apparatus 26 is in the raised position. In the preferred embodiment discussed herein, a line generator creates a fan angle of coherent laser light of approximately 35°, plus or minus 5° to insure that the linear alignment marker 12 will be focused generally on the workpiece 14.

The preferred light projection system 56 of the alignment invention has two sensor lights, 64, 66, preferably on the front of the upper guard 48, although the sensor may be located on any suitable surface. The first sensor light 64 is preferably green and indicates that the light projection system 56 is operating. In the preferred embodiment, the light projection system 56 and the first sensor light 64 are continuously activated whenever the miter saw 14 is plugged into an electrical outlet, thereby signaling to the user that the saw 14 is plugged-in. It will be understood that the light projection system 56 may alternatively be activated/deactivated by a switch or attenuated by some mechanical means.

The second sensor light 66 is preferably red and indicates that the light projection system 56 has shut off due to a high temperature or a low temperature condition. In the preferred light projection system 56 of the present alignment invention, the red shut off light is triggered when the ambient temperature is below −10° C. or above 48° C.

As will be discussed in detail below, the light projection system 56 is preferably equipped with a series of adjustments for selectively adjusting the relationship of the blade 36 with respect to the position of the optical alignment marker 12 on the workpiece 14. FIG. 1 illustrates the preferred lateral adjustment mechanism, which comprises a right push knob 68 and left push knob 70 (See FIG. 3). Lateral movement of the light projection system is preferably limited by an upper end stop 72 and a lower end stop 74 (not shown) on each side of the upper blade guard 48.

Figure 2:
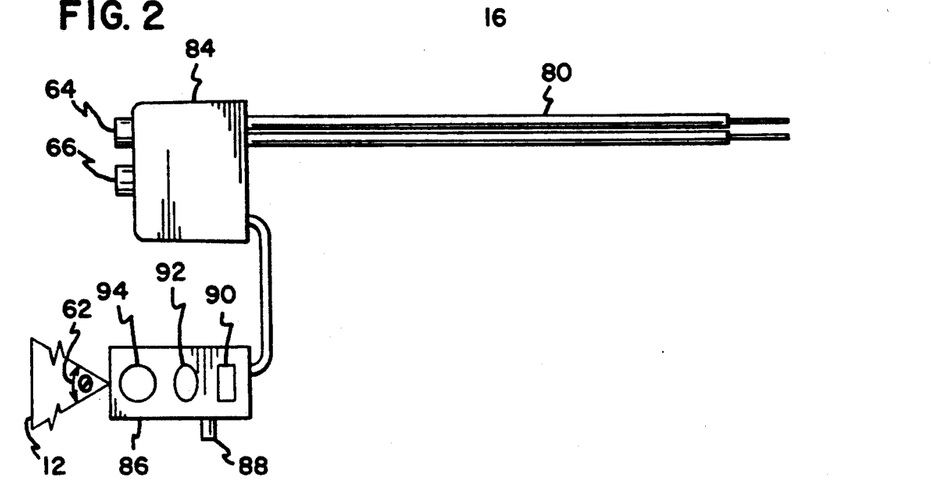
FIG. 2 illustrates the preferred laser source for generating the optical alignment marker.

FIG. 2 illustrates the electrical portion of the preferred light projection system 56 of the present alignment invention. A transformer (not shown) connected to the main power cord 78 converts standard house current (110 volts AC) to preferably 5 volts (DC). The transformer is connected by wires 80 to the control electronics (not shown), which are contained within a sealed control box 84. The first and second sensor lights, 64, 66, discussed above, are mounted to the control box 84. A laser barrel 86 with a pivot pin 88 contains a laser source 90, which is connected to the control electronics.

The laser 90 is preferably a visible laser diode with 5.0 milliwatts maximum output and a wavelength of 620 to 680 nanometers. Government regulations require that the laser comply with FDA 21 CFR 1040.10 and 1040.11 class IIIA laser products. It will be understood by those skilled in the art that a variety of light projection systems 56 are possible, and that it is possible to use a non-coherent light source. It will also be understood by those skilled in the art that to generate the preferred linear alignment marker 12, the coherent laser light from the laser preferably passes through a lens 92, which generates a point source of light. The point source of coherent laser light then passes through a spherical line generator 94 to generate the generally linear alignment marker 12.

Figure 3:
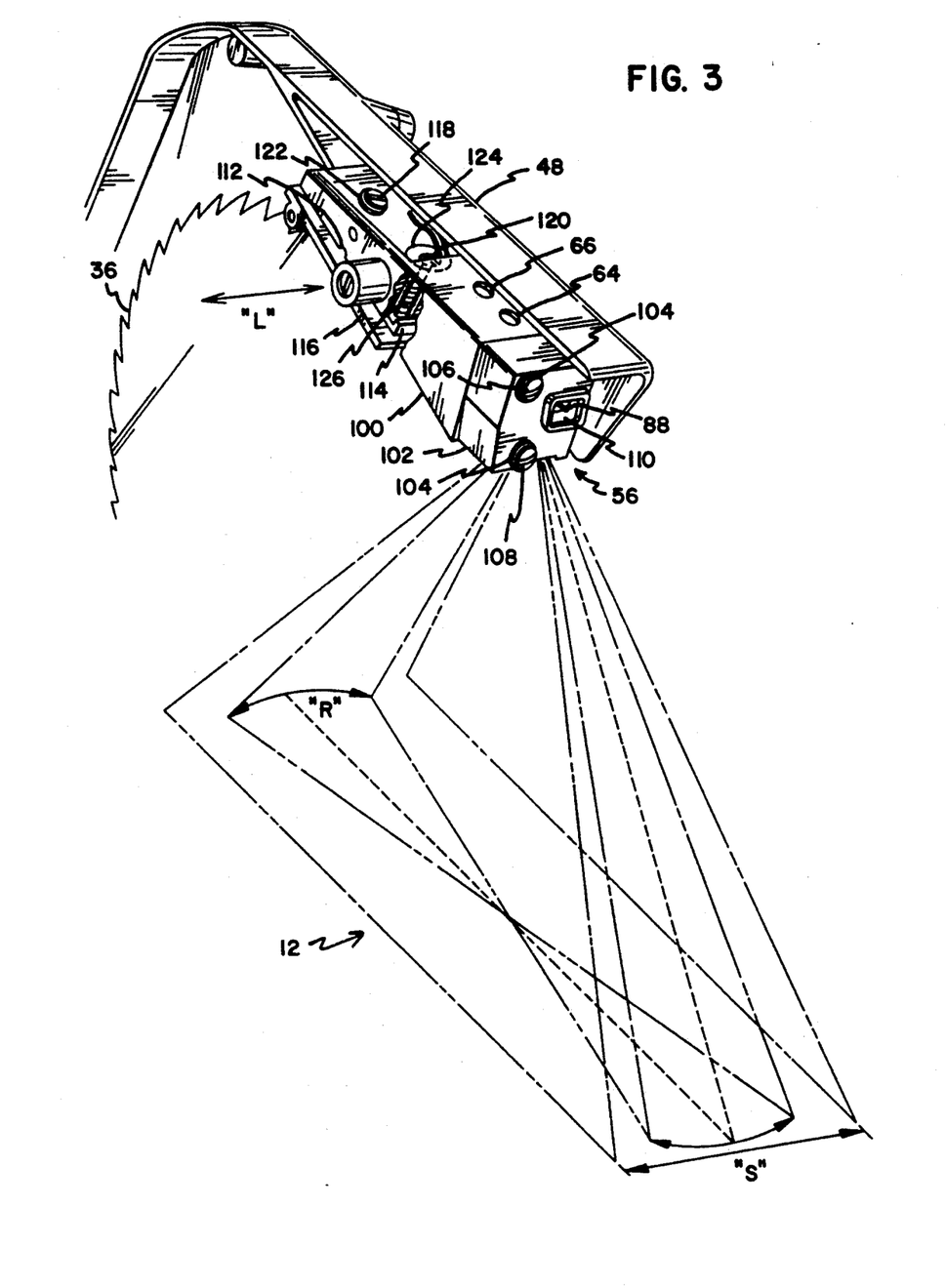
FIG. 3 illustrates a preferred adjustment system for adjusting the orientation of the light projection system of the present alignment invention.

FIG. 3 illustrates the preferred adjustment mechanism 96 for adjusting the special relationship between the optical alignment marker 12 and the blade 36. The light projection system 56 is substantially contained within a housing 100 which is mounted in the front portion of the upper blade guard 48. The laser barrel 86 (See FIG. 2) is mounted behind a laser assembly cap 102 and is oriented to project downward onto the workpiece 14. The laser assembly cap 102 has a pair of slotted holes 104 through which two screws 106, 108 pass to anchor the cap 102 to the housing 100. By loosening the screws 106, 108, the laser assembly cap 102 can be rotated so that the optical alignment marker 12 may be moved on the workpiece 14 along an axis perpendicular to the blade 36, illustrated by arrows "S".

The pivot pin 88 extends through an opening 110 in the front of the laser assembly cap 102, which allows the laser barrel 86 to be rotated within the housing 100. Rotation of the laser barrel 86 via the pivot pin 88 allows adjustment of the parallelism of the optical alignment marker 12 with respect to the blade 36, illustrated by arrows "R".

The housing 100 has a series of slide grooves 112 which engage with a pair of slide rails 114 on a slide plate 116. The slide plate 116 is mounted inside the upper blade guard 48. By pressing the left push knob 70 or right push knob 68 (See FIG. 1), the operator can move the light projection system 56 laterally in the direction "L". The lateral movement of the light projection system 56 allows the alignment marker 12 to be located on either side of the blade 36. In its preferred operation, the light projection system 56 is pressed completely to one side or the other until it engages the end stops 72, 74. However, it will be appreciated that the lateral adjustment system of the present alignment invention permits the light projection system 56 to be located at any position along the travel of the slide plate 116.

As previously discussed, the preferred light projection system 56 generates an optical alignment marker 12 which is 0.030" wide. Since the alignment marker 12 is narrower than the width 37 (See FIG. 4) of the blade 36, it is possible to position the light projection system 56 along the edge of the blade 36, so that the blade 36 partially obstructs the alignment marker 12 and the unobstructed portion of the alignment marker 12 accurately indicates where the side of the blade 36 will engage the workpiece 14.

Alternatively, it may be desirable for the alignment marker 12 to be wider than the width 37 of the blade 36. By centering the wide alignment marker 12 over the blade 36, the blade 36 will obstruct the center portion of the alignment marker 12 and the unobstructed portions will accurately indicate where both sides of the blade 36 will engage the workpiece 14. It will be understood that a more powerful laser (approx. 10-20 milliwatts) may be required to accomplish this alternate embodiment.

The housing 100 is mounted to the slide plate 116 by a pair of housing screws 118, 120 which pass through a pair of laterally slotted openings 122, 124 that allow the housing 100 to be moved in the lateral direction. Preferably, a pair of biasing springs 126 are interposed between the slide plate 116 and the housing 100 to secure the light projection system 56 at a particular location. The biasing springs 126 preferably generate approximately 8 lbs. of force. It will be understood by those skilled in the art that a variety of systems could be used to retain the light projection system 56 in a particular position. It also will be appreciated that the light projection system 56 of FIG. 3 may be enclosed within an exterior housing (not shown) so that it may be attached to any suitable surface on a miter saw.

Figure 4:
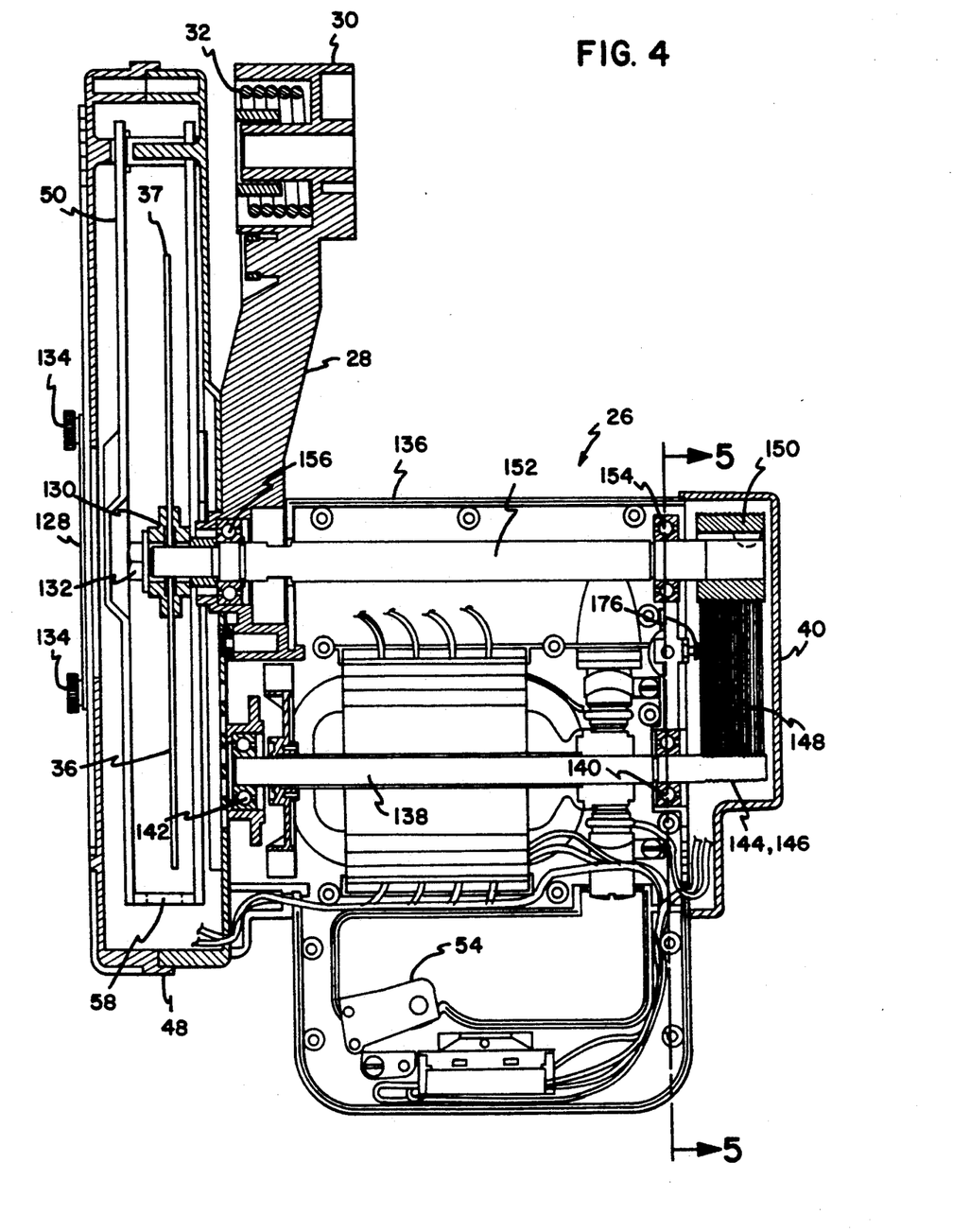
FIG. 4 illustrates a top sectional view of a preferred belt-driven miter saw with an adjustable pulley system.

FIG. 4 illustrates a top sectional view of preferred miter saw 10. As discussed above, the preferred support spring 32 is located internally to the support coupling 30. However, it will be understood that a variety of configurations are possible. FIG. 4 also illustrates the slit 58 in the lower blade guard 50 through which the optical alignment marker 12 preferably passes. A cover plate 128 is included on the upper blade guard 48 for providing access to a blade flange 132 and blade bolt 134. The cover plate 128 is held secure to the upper blade guard 48 by a pair thumbscrews 134.

The preferred motor 34 contained within a motor housing 136 has an elongated motor shaft 138 supported by a pair of motor shaft bearings 140, 142. One end of the shaft preferably has a series of machined grooves 144 that operate as a motor pulley 146 for engaging a drive belt 148. The outside diameter of the preferred motor pulley 146 is 0.468".

A blade pulley 150 is coupled to the blade 36 by an elongated blade shaft 152. The outside diameter of the blade pulley is preferably 1.410" and contains a series of grooves which correspond to the motor pulley 146. The blade shaft 152 is also supported by a pair of blade shaft bearings 154, 156. The elongated motor and blade shafts 138, 152 provide support to counteract the torque caused by the drive belt 148. The motor pulley 146 and blade pulley 150 combination preferably provides a 3:1 reduction. The motor 34 preferably runs at between 17,000-19,000 rpm's and the 3:1 reduction of the pulleys 138, 152 causes the blade 36 to run at a no-load speed of approximately 5600 rpm's.

The blade 36 is anchored to the blade shaft 152 by the blade flange 132 and blade bolt 134. Underwriters Laboratories specifies that the blade flange 132 must be at least 1.75" in diameter. In the preferred embodiment of the pulley system invention, the portion of the blade housing 40 proximate the blade pulley 150 is generally the same diameter as the blade flange 132 so that the blade pulley 150 and belt housing 40 do not reduce the cutting radius of the blade 36.

It will be understood by those skilled in the art that the small diameter of the motor pulley 146 will create extreme heat on the drive belt 148. Applicants have found that a drive belt 148 constructed of Kevlar® (low yarn density) provides large force transmission without being damaged by the corresponding heat. The preferred belt of the present invention is available from Circular Technologies of Boulder, Colo.

Figure 5:
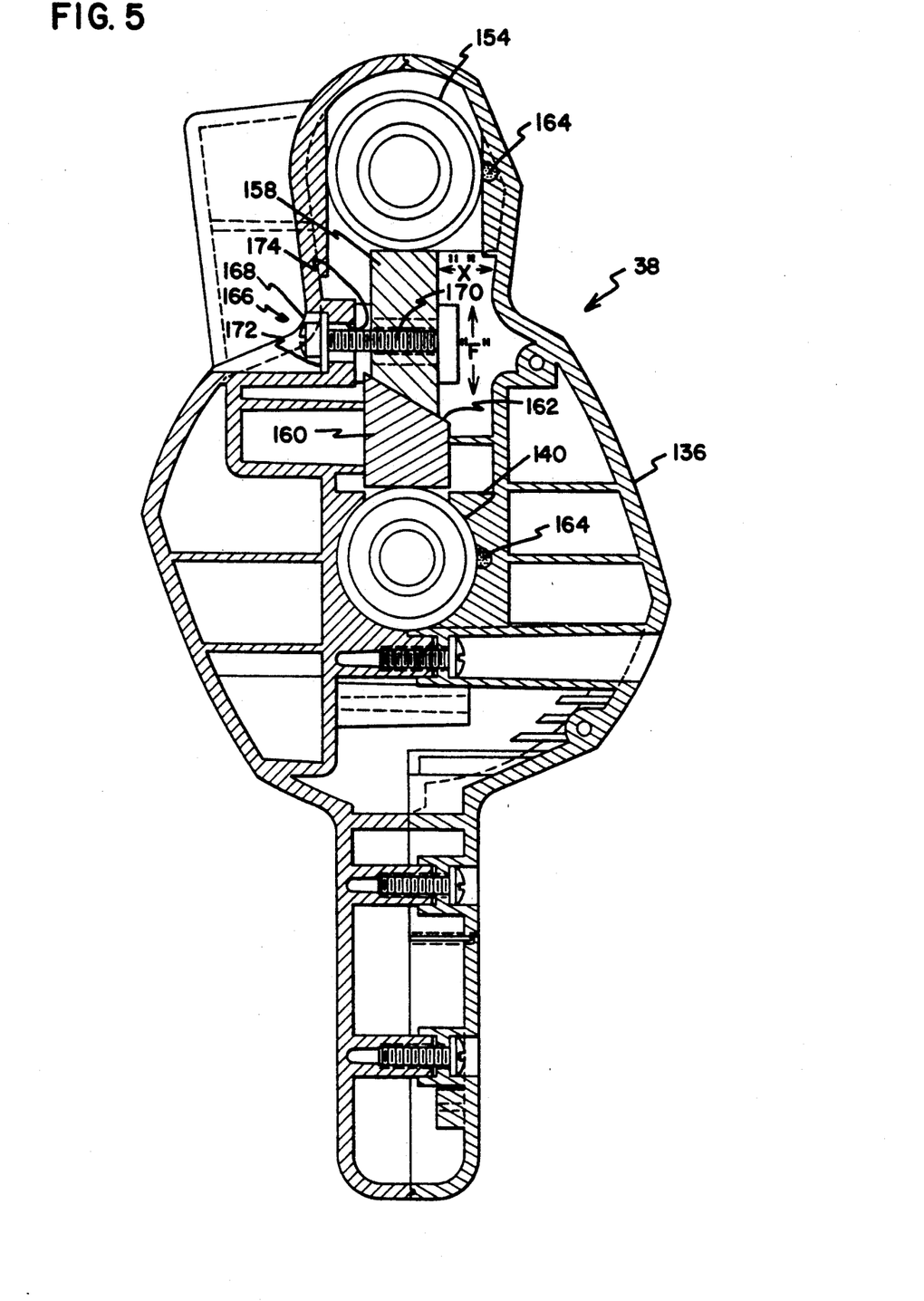
FIG. 5 illustrates a sectional view of a preferred adjustment mechanism for use with a motorized belt-driven miter saw.

Turning now to FIG. 5, which is a sectional view of FIG. 4, the preferred pulley tensioning system 38 comprises a first rigid member 158 and a second rigid member 160 with opposing beveled surfaces 162 interposed between the blade bearing 154 and the motor bearing 140. The second rigid member 160 is preferably stationary. The first rigid member 158 is allowed to move in the direction "X" so that relative movement of the beveled surfaces 162 increases or decreases the force in the direction "F". Rubber plugs 164 are provided to secure the outer surface of the bearings 140, 142, 154, 156, to the motor housing 136.

A tension adjustment screw 166 having a head 168, a threaded portion 170 and a wear plate 172 may be attached to the first rigid member 158 through a slotted opening 174 in the motor housing 136. Rotation of the tension adjustment screw 166 in the clockwise direction moves the first rigid member 158 toward the head 168 of the tension adjustment screw 166, whereby the distance between the blade bearing 154 and the motor bearing 140 is increased. The wear plate 172 allows the tension adjustment screw 166 to move within the slotted opening 174. Referring again to FIG. 4, a set screw 176 with a nylon tip is provided to prevent the pulley tensioning system 38 from moving due to vibration.

In the preferred belt tensioning system 38, a total of 0.090" of adjustment is available. Approximately 0.060" is used for putting on or taking off the drive belt 148.

The remaining 0.030" is available for tensioning the belt 148 as it stretches. It will be understood that the adjustment range of the belt tension system 38 may vary depending on the length and construction of the belt, the type of pulleys, etc.

Applicants have found that the tensioning system 38 of the present pulley system invention extends the life of the drive belt 148, since additional tension can be placed on the belt 148 as it wears and stretches over time. Further, belt tensioning system 38 allows the drive belts 148 to be manufactured to a looser tolerance, thereby decreasing its manufacturing cost.

It will be understood by those skilled in the art that the present inventions are not limited to the examples discussed above, but may be changed or modified without departing from the spirit or scope of the invention. It will be understood by those skilled in the art that a wide variety of miter saw configurations may incorporate the light projection system or adjustable pulley system of the present invention. Further, it will be recognized that the light projection system of the present alignment invention may be attached to any suitable surface on the miter saw.

We claim:

1. A miter saw with an optical system for projecting an optical alignment marker onto a workpiece, comprising:
    a base;
    a turntable rotatably supported by the base, the turntable having a front and rear portion;
    a fence disposed above the base for supporting the orientation of the workpiece located on the base;
    a support coupled to the rear portion of the turntable;
    cutting means including a blade for cutting the workpiece, the cutting means being pivotally coupled to the support for positioning the blade from a raised position above the workpiece to an operational position for engagement with the workpiece to an operational position for engagement with the workpiece, the blade having a radius, two sides, and a width and the cutting means having a front and rear portion; and
    light projecting means attached to the cutting means for projecting a planar beam of light past one side of the blade and onto the workpiece in order to form a linear optical alignment marker on the workpiece, the linear optical alignment marker having a thickness and two sides, the light projection means further comprising adjustment means for adjusting the alignment marker so that the side of the alignment marker facing the blade is coincident with a plane defined by the one side of the blade, whereby the side of the linear optical alignment marker that is coincident with the plane defined by the one side of the blade will designate the location at which the one side of the blade will enter the workpiece.

2. The apparatus of claim 1 wherein the light projection means comprises laser means for projecting a coherent beam of visible light.

3. The apparatus of claim 2 wherein the laser means includes optical means comprising a line generator for converting the beam into a linear alignment marker having generally linear configuration substantially parallel to the blade.

4. The apparatus of claim 3 wherein the length of the linear alignment marker generally corresponds to the distance from the front to the rear portion of the turntable when the blade is in the raised position.

5. The apparatus of claim 2 wherein the laser means includes sensor means for sensing high temperature and low temperature conditions and for terminating operation of the laser means in response to temperatures above the high temperature condition or below the low temperature condition.

6. The apparatus of claim 1 wherein the adjustment means includes means for adjusting the special relationship between the optical alignment marker and the blade.

7. The apparatus of claim 1 wherein the adjustment means includes rotational adjustment means for moving the location of the optical alignment marker on the workpiece along an axis perpendicular to the blade.

8. The apparatus of claim 1 wherein the adjustment means includes rotational adjustment means for rotating the light projection means in order to adjust the parallelism of the optical alignment marker with respect to a side surface of the blade.

9. The apparatus of claim 1 wherein the adjustment means includes lateral adjustment means for moving the light projection means along an axis perpendicular to the blade.

10. The apparatus of claim 9 wherein the lateral adjustment means comprises slide means for sliding the light projection means laterally.

11. The apparatus of claim 9 wherein the lateral adjustment means includes biasing means for securing the light projection means at a particular location.

12. The apparatus of claim 9 wherein tho lateral adjustment means includes end stops to limit the lateral movement of the light projection means.

13. The apparatus of claim 9 wherein the lateral adjustment means comprises means for adjusting the lateral position of the light projection means to be positioned generally along one side of the blade so that the width of the blade obstructs a portion of the alignment marker and the unobstructed portion of the alignment marker identifies the location where at least one side of the blade will engage the workpiece.

14. The apparatus of claim 1 wherein the light projection means is located proximate the front portion of the cutting means.

15. The apparatus of claim 1 wherein the cutting means includes an upper guard and the light projection means is located within the upper guard.

16. The apparatus of claim 15 wherein the light projection means is located within the upper guard proximate the front portion of the cutting means.

17. The apparatus of claim 16 wherein the cutting means includes a lower guard with a front portion and a rear portion located generally between the cutting means and the turntable, the front portion of the lower guard having a slit opening through which the optical alignment marker may be projected onto the workpiece.

18. A miter saw with an optical system for projecting an optical alignment marker onto a workpiece, comprising:
    a base;
    a turntable rotatably supported by the base, the turntable having a front and rear portion;
    a fence disposed above the base for supporting the orientation of the workpiece located on the base;
    a support coupled to the rear portion of the turntable cutting means including a blade for cutting the workpiece, the cutting means being pivotally coupled to the support for positioning the blade from a raised position above the workpiece to an operational position for engagement with the workpiece, the blade having a radius, a first side, a second side, and a width and the cutting means having a front and rear portion; and light projection means attached to the cutting means for projecting a planar beam of light past either the first or the second side of the blade and onto the workpiece in order to form a linear alignment marker on the workpiece along a selected side of the blade, the linear optical alignment marker having a thickness and two sides, the light projection means further comprising adjustment means for selectably adjusting the alignment marker so that the side of the alignment marker facing the selected side of the blade is coincident with a plane defined by the selected side of the blade, whereby the side of the linear optical alignment marker that is coincident with the plane defined by the selected side of the blade will designate the location at which the selected side of the blade will enter the workpiece.

19. A miter saw with an optical system for projecting an optical alignment marker onto a workpiece, comprising:

a base;
a turntable rotatably supported by the base, the turntable having a front and rear portion;
a fence disposed above the base for supporting the orientation of the workpiece located on the base;
a support coupled to the rear portion of the turntable;
cutting means including a blade for cutting the workpiece, the cutting means being pivotally coupled to the support for positioning the blade from a raised position above the workpiece to an operational position for engagement with the workpiece, the blade having a radius, two sides, and a width and the cutting means having a front and rear portion; and light projection means attached to the cutting means for projecting a beam of light past at least one side of the blade and onto the workpiece in order to form an optical alignment marker on the workpiece, the alignment marker facing the at least one side of the blade, the light projection means further comprising adjustment means for adjusting the beam of light so that a particular portion of the alignment marker is coincident with a plane defined by one side of the blade, whereby the location of the particular portion of the alignment marker that is coincident with the plane defined by the one side of the blade designates the location at which the one side of the blade will enter the workpiece.

* * * * *

UNITED STATES PATENT AND TRADEMARK OFFICE
CERTIFICATE OF CORRECTION

PATENT NO. : 5,285,708
DATED : February 15, 1994
INVENTOR(S) : Bosten et al.

It is certified that error appears in the above-identified patent and that said Letters Patent is hereby corrected as shown below:

Title page, item (21):    Appl. No.:, "855,313" should read --885,313--.

Col. 1, line 55, "3-½ X 3-½" " should read --3-½" x 3-½"--.

Col. 4, line 58, "special" should read --spacial--.

Col. 7, line 39,40,41, delete "to an operational position for engagement with the workpiece" after the word "workpiece".

Col. 7, line 44, "projecting" should read --projection--.

Col. 8, line 10, claim 6, "special" should read --spacial--.

Col. 9, line 10, claim 18, "planarbeam" should read --planar beam--.

Signed and Sealed this

Twentieth Day of September, 1994

Attest:

BRUCE LEHMAN

*Attesting Officer*        *Commissioner of Patents and Trademarks*